United States Patent [19]
Porter

[11] Patent Number: 5,134,774
[45] Date of Patent: Aug. 4, 1992

[54] ANCHORING METHOD FOR HYDRAULIC TURBINE REPAIR

[75] Inventor: Benny R. Porter, Chattanooga, Tenn.

[73] Assignee: Arc Plan, Inc., Chattanooga, Tenn.

[21] Appl. No.: 765,392

[22] Filed: Sep. 19, 1991

Related U.S. Application Data

[63] Continuation of Ser. No. 667,455, Mar. 11, 1991, abandoned.

[51] Int. Cl.$^5$ .............................................. B21K 3/00
[52] U.S. Cl. ........................... 29/889.1; 29/402.18; 156/94; 156/305
[58] Field of Search ..................... 29/889.1, 402.18; 156/305, 293, 294, 94

[56] References Cited

U.S. PATENT DOCUMENTS

| | | | |
|---|---|---|---|
| 3,642,937 | 2/1972 | Deckert et al. | 156/305 |
| 3,666,597 | 5/1972 | Parnell et al. | 156/305 |
| 3,793,698 | 2/1974 | Goings | 29/402.18 |
| 3,860,565 | 1/1975 | Barber, Jr. | 156/305 |
| 4,224,971 | 9/1980 | Müller et al. | 156/305 |
| 4,884,326 | 12/1989 | Porter et al. | 29/889.1 |

FOREIGN PATENT DOCUMENTS 2705751  7/1978  Fed. Rep. of Germany ...... 156/305

Primary Examiner—Irene Cuda
Attorney, Agent, or Firm—Varnum, Riddering, Schmidt & Howlett

[57] ABSTRACT

An anchoring process for use in a hydraulic electric facility turbine structure (1) includes, allowing for anchoring of a turbine liner wall (8) to a backing wall (9) while the liner wall (8) is in place and during repairs. The process includes positioning of apertures (20) within the liner wall (8). Second apertures (22) coaxial with the apertures (20) in the liner wall (20) are drilled into the backing wall (9) sufficient for purposes of embedding a reinforced steel bar (44) in a manner so as to appropriately support the liner wall (8). After the apertures (20, 22) had been formed, an adhesive material (42) in an unactive state in inserted into the aperture (20) of the liner wall (8) and into the secondary aperture (22) of the concrete backing wall (9). The steel reinforcing bar (44) is then inserted through the aperture (20) of the liner wall (8) and into the secondary aperture (22) of the backing wall (9). The reinforcing bar (44) causes the adhesive material (42) to be released and activated, and provide adhesion between the reinforcing bar (44) and the interior surfaces of the secondary aperture (22). The reinforcing bar (44) is then cut off an appropriate distance into the liner wall (8). A weld overlay material (48) is then applied to the reinforcing bar (44) within the liner wall aperture (20). The overlay material (48) is applied so that the material fills up the aperture (20) in a manner such that the material is flush with the interior surface of the liner wall (8). In this manner, the reinforcing bar (44) is appropriately welded to the liner wall (8) and provides a rigid and stable interconnection of the liner wall (8) to the concrete backing wall (9).

21 Claims, 5 Drawing Sheets

ANCHORING METHOD FOR HYDRAULIC TURBINE REPAIR

This is a continuation of application Ser. No. 07/667,455, filed Mar. 11, 1991, abandoned.

BACKGROUND OF THE INVENTION

1. Field of the Invention

The invention relates to the repair of hydroelectric assemblies and, more particularly, relates to methods for maintaining stability of assembly components during the repair process.

2. Description of Related Art

Historically, hydroelectric facilities have been utilized for purposes of generating electricity through the use of power resulting from movement of water through gravitational forces. Such facilities can comprise one or more electrical generator units, with each unit powered by a hydraulic turbine mechanism.

Modern hydroelectric facilities typically are designed around a vertically mounted shaft. Attached to the upper portion of the shaft is a generator rotor. Correspondingly, a hydraulic turbine assembly is typically attached adjacent the lower portion of the shaft, and comprises a series of turbine blades. The water enters the area of the turbine mechanism at a point above the turbine blades. Through gravitational forces, the movement of the water causes the rotation of the turbine blades at a speed sufficient so as to cause the generator portion of the facility to appropriately generate electricity.

The internal environment of the hydroelectric turbine assemblies is relatively severe. That is, the turbine blades are subjected to relatively large stresses resulting from the water movement and blade rotation. In addition, the walls surrounding the turbine blades, typically characterized as the liner wall, are also subjected to severe stresses.

Such stresses are commonly explained in accordance with known principles of fluid mechanics. For example, the water flow within a hydraulic turbine will cause a phenomenon known as "cavitation." This phenomenon will subject fluid flow surfaces (e.g. liner walls and turbine blade surfaces) to intense local stressing, which appears to damage flow surfaces by fatigue. Cavitation within a hydraulic turbine will result in pitting and general surface deterioration of liner walls and blades.

The principles of cavitation and other fluid mechanics stress phenomena are relatively well-known, and are explained in conventional texts such as Streeter, *Fluid Mechanics* (McGraw-Hill 1966, 4th Ed.). Cavitation occurs in a flowing liquid whenever the local pressure of the liquid falls to the liquid vapor pressure. When this point is reached, local vaporization of the liquid will result, causing a hole or cavity in the flow of the liquid. The cavity contains a swirling mass of droplets and vapor. When the pressure exerted on the flowing liquid is raised above the vapor pressure of the liquid, the low-pressure cavity rapidly collapses and the surrounding liquid rushes in to fill the void. At the point of disappearance of the cavity, the inrushing liquid comes together and momentarily raises the local pressure within the liquid to a very high level. When the point of collapse of the cavity is in contact with a metal surface, the surface may be stressed locally beyond its elastic limit, resulting eventually in fatigue, pitting and destruction of the material. In a hydroelectric facility, cavitation occurs on the turbine blades and the interior walls or lining of the turbine in the area of the turbine blades. Typically, cavitation erosion on the surfaces in a hydroelectric facility must be repaired relatively frequently, e.g. once per year.

A common method for repairing cavitation erosion on turbine wall surfaces is to remove the heavily-pitted material by various grinding means, and then replace this removed material by a welding process. In the past, such repair has been accomplished by various hand-held grinding tools and replacing the ground material by welding stainless steel to the ground surfaces. These conventional methods of repair are extremely slow and expensive due to the lengthy down-time of the hydroelectric unit being serviced.

An attempt to speed up this repair process is disclosed in the U.S. Pat. No. 3,793,698 issued Feb. 26, 1974 to Goings. The Goings '698 patent is incorporated herein by reference. The Goings '698 patent discloses a semi-automatic method and apparatus for machining and welding the liner of a hydroelectric structure. The Goings apparatus includes machining tooling installed on a lower portion of the hydroelectric shaft, such that the tooling is brought into operative engagement with the tube wall or liner.

The generator portion of the hydroelectric structure disclosed in the Goings '698 patent comprises a rotor which is moved by the runner or rotor of a hydraulic turbine. Gates control the entry of water into the draft tube of the turbine, with the blades of the turbine runner positioned within the upper cylindrical portion of the draft tube. The rotational axis of the turbine runner is concentric with the rotational axis of the rotor of the generator. The generator rotor has an extending portion which carries an annular shoe adapted to cooperate with an adjacent member which provides for braking the movement of the rotor, in the event of a failure or other emergency.

For purposes of repair, a temporary floor structure is constructed across the draft tube below a runner hub. A collector ring assembly is attached to the lower end of the runner, with the collector ring providing for transference of electrical power and pneumatic lines into the runner.

An external power unit is installed adjacent the extending portion, which rotates with the generator rotor. This power unit can include an electric motor having V-belts which drive a roller or traction member engaging the adjacent face of the annular track carried by the generator rotor portion. A control panel provides for control of the drive motor. Through reduction gearing between the motor and the traction member, energization of the motor results in a rotational force being applied to the generator rotor shaft and, correspondingly, to the runner shaft and runner. During rotation, machining and welding operations can be carried out on the draft tube liner.

In addition to the arrangement for exerting rotational forces on the generator rotor, the Goings arrangement also includes a series of support members temporarily welded to the surface of one of the runner blades. These support members mount a vertical member on which travels a cutting or machining tool holding head. The holding head can be adjustably positioned along the vertical member by means of an adjustment wheel. In addition, the structure also includes a seat for an operator riding the structure and observing the machining operation. A machining tool is adapted to extend from the tool holding head into a machining engagement with the adjacent draft tube wall surface.

In operation, scaffolding is temporarily attached to and supported by the runner blades. The scaffolding is utilized to support welding apparatus, including a welding rod supply reel. The scaffolding structure also carries a vertical member which supports a vertically movable welding head. The welding head is adjustably movable in a vertical direction along the vertical member. A second operator seat is provided for purposes of observing the welding operation. As the turbine runner is rotated, the welding head is made to traverse the curved surface of the tube wall. The arrangement of the scaffolding and the welding equipment is such that a welder can weld pitted areas of the blades as the rotation of the turbine runner proceeds.

After conditioning equipment, such as the cutting tool and the welding head, have been installed, the turbine runner can be rotated by the rotational mechanism previously described. Material of the draft tube wall can be machined off to a desired depth. Weld material, such as stainless steel, can then be applied to the wall. Also, a carbon-steel build-up layer can be initially applied to the wall, and subsequently covered by the stainless steel surface. The tube surface can then subsequently again be machined so as to smooth the stainless steel build-up. Further, severely damaged outer edges of the blades can have sections removed, and the gaps renewed with stainless steel sections. Such operations on the blades are carried out by an operator utilizing hand-held tools, while the machining and welding of the tube surface is performed as the turbine runner is rotated.

While the Goings '698 patent structure has provided advantages in operation over previously-known arrangements for on-site repair of hydroelectric turbine surfaces, several problems still exist with respect to the method of operation of the Goings repair arrangement. For example, with the particular structure utilized in the Goings arrangement, and with the rotational forces applied to the generator rotor, it has been found that rotation of the turbine shaft and the machining tooling mounted to the turbine blades can be relatively jerky and erratic. Accordingly, a relatively severe amount of chatter and vibration can occur during the machining operation.

Further, with the forces exerted directly on the generator rotor relatively far above the turbine blades, the rotational system is far removed from the location of the machining operations. Therefore, the rotational system is not convenient for purposes of precise and spontaneous adjustments of the rotation speed. Still further, with the positioning of the application of rotation forces at the perimeter of the generator rotor, a relatively substantial force is required to achieve appropriate rotational speed. Accordingly, motors of substantial size must be employed. Correspondingly, the motor apparatus for exerting the rotational forces is relatively bulky and expensive. The bulkiness can cause substantial problems and expense, with respect to transportation and assembly of the apparatus at a job site.

A substantial advance in the state-of-art of hydraulic repair systems has been achieved as disclosed in U.S. Pat. No. 4,884,326 issued to Porter et al on Dec. 5, 1989. The Porter et al patent describes a method and apparatus primarily directed to rotation of a hydroelectric assembly for purposes of repairing and resurfacing of turbine liner walls pitted as a result of cavitation. The method is adapted for use in a hydroelectric turbine structure comprising a turbine shaft, generator rotor assembly coupled to an upper portion of the shaft and a turbine blade assembly coupled to a lower portion of the shaft. The turbine blade assembly includes a plurality of turbine blades extending radially from the turbine shaft. A turbine chamber having a substantially cylindrical configuration is formed by a vertically-disposed liner wall adjacent distal ends of the turbine blades.

The method includes removing water from the turbine chamber, and mounting a repair assembly at or substantially adjacent a distal end of at least one of the turbine blades. The repair assembly can include conditioning devices for repairing surface deterioration of the liner wall. A turning apparatus is mounted at or substantially adjacent a distal end of at least one of the turbine blades. The turbine blades and turbine shaft are slowly rotated by exerting forces directly between the turning apparatus and the liner wall, thereby causing the conditioning devices to traverse the liner wall.

The mounting of the turning apparatus includes the mounting of a support assembly directly to one of the turbine blades. A turning wheel is mounted in a pivotable configuration relative to the support assembly. The turning wheel is engaged with the liner wall so as to be in frictional contact therewith. Rotational forces are then exerted on the turning wheel to rotate the turning wheel, thereby causing the turning wheel to traverse the liner wall, and further causing rotation of the turbine blades.

The turning apparatus includes a support structure adapted to be mounted to at least one of the turbine blades. The support structure includes first and second support braces, with each of the braces having one end secured adjacent a distal end of at least one of the turbine blades. A first pivot assembly is then pivotably coupled to an upper end of the support brace and to a distal end of a piston cylinder rod, so that the piston mechanism is pivotable in a pitch mode relative to a horizontal plane extending through the piston cylinder rod. A turning mechanism mounting bracket is also provided, and a second pivot assembly is provided to pivotably couple one end of the piston cylinder with one end of the mounting bracket. A third pivot assembly can pivotably couple another end of the mounting bracket to an upper end of the second support brace.

In accordance with the Porter et al arrangement, the rotation of the turbine blades and turbine shaft by operation of a turning wheel directly against the liner wall provides a requisite "steady" rotational movement for purposes of undertaking repairs of the liner wall. Further, with the position of the turning mechanism adjacent a distal end of one of the blades, the mechanical advantage provided by this positioning is substantial. Accordingly, a relatively small motor drive assembly can be employed for providing the requisite rotation of the turbine blades, notwithstanding the massive size of conventional turbine blades and turbine shafts. Exerting forces between the turbine turning mechanism and the liner wall in the manner as described in the Porter et al arrangement provides a substantial advantage over other arrangements, whereby the turbine blades are rotated through externally-generated forces which must be translated through the turbine shaft.

Various types of machining and grinding mechanisms are relatively well-known and adapted for performing such functions in applications other than hydraulic turbine repair. One type of grinding mechanism suitable for performing hydraulic turbine repair in accordance with the Porter et al arrangement is disclosed in the commonly assigned and co-pending U.S. patent application Ser. No. 397,051, Porter, filed Aug. 22, 1989. The Porter application discloses an arrangement for rotating the turbine blades and turbine shaft to facilitate repair of pitting and general deterioration of the liner walls. A vertical support structure is mounted to one or more of the turbine blades substantially adjacent the wall. The grinding apparatus includes a grinder contact wheel, along with a grinding belt coupled around the wheel. An energizing arrangement is provided for selectively rotating the grinder contact wheel and the belt.

A support arrangement is provided for mounting the grinder contact wheel, grinding belt and energizing arrangement. An adjustable connection mechanism is coupled to the support arrangement and to the vertical support structure for mounting the grinder contact wheel to the support structure. A further connection arrangement is also provided for adjusting the horizontal position of the grinder contact wheel relative to the vertical support structure, with the adjustment being in a radial direction relative to the turbine shaft. The vertical support structure also includes an additional adjustable connection arrangement coupled to the adjustable connection arrangement for adjusting the vertical position of the grinder contact wheel relative to the vertical support structure.

Although the apparatus and methods described in the foregoing paragraphs provide substantial advantages in the state of the art with respect to hydroelectric turbine repair, other aspects of the repair process also require attention. For example, as earlier described, repair of the cavitation damage associated with liner walls and discharge rings requires the removal of pitted or cavitated liner wall material. Typically, this liner wall material is in the form of carbon steel or the like. During the repair process, the liner wall material is replaced by stainless steel weldments.

However, in accordance with known and conventional metallurgical phenomena, welding of the liner wall or discharge ring will result in shrinkage. Typically, the shrinkage factor between carbon steel and stainless steel is in the range of a ratio of approximately 40 to 1. During and subsequent to the welding process, the actual amount of shrinkage which occurs is substantially proportional to the number of welding stringer beads which may be utilized to clad the liner wall. That is, the greater number of stringer beads utilized, the greater will be the shrinkage forces.

Typically, the liner walls are positioned adjacent concrete or other cementitious material positioned behind the liner wall. The liner walls are typically held in place through the use of vertical and horizontal stiffeners. The shrinkage forces resulting from the stainless steel weldments are in part exerted against these vertical and horizontal stiffeners. Again, as the number of stringer beads employed during the welding process increases, the shrinkage forces exerted against the stiffeners correspondingly increase.

Although the shrinkage forces against the stiffeners can present problems, it is the vulnerability of the carbon steel liner wall area between the stiffeners which presents the most significant problems. In these areas, there is no anchoring of the liner walls to the adjacent concrete walls. Significant warpage can thus occur as a result of the shrinkage factor ratio between the carbon and stainless steels.

Efficient operation of hydroelectric turbines requires a substantially optimal "roundness" of the liner wall. If substantial shrinkage or warpage occurs in the liner walls, roundness is destroyed and significant problems can occur with respect to turbine operation. Typical specifications for liner wall roundness often require an "out of round" specification of no more than plus or minus 25/1000 of an inch. The specifications also often require the roundness variation not to exceed plus or minus 10/1000 of an inch between liner wall stiffeners.

SUMMARY OF THE INVENTION

The invention relates to a method for use in a hydroelectric turbine structure. The structure comprises a turbine shaft, a generator rotor assembly coupled to an upper portion of the turbine shaft, a turbine blade assembly coupled to a lower portion of the turbine shaft and a turbine chamber having a cylindrical configuration. The turbine blade assembly comprises a plurality of turbine blades extending radially from the turbine shaft. The cylindrical turbine chamber is formed by a vertical disposed turbine liner wall, adjacent distal ends of the turbine blades and a backing wall located behind and substantially abutting the liner wall. The method is directed to providing anchoring of the liner wall to the backing wall during a repair process in a manner such that the liner wall is maintained in place within the hydroelectric turbine structure relative to the backing wall. The method comprises the steps of forming a first aperture within and extending through the liner wall, in a position apart from other elements of the hydroelectric turbine structure supporting or otherwise interconnecting the liner wall to the backing wall. Next, an elongated secondary aperture is formed in the backing wall adjacent to and substantially coaxial with the first aperture. An adhesive capsule containing an inactive adhesive material is extended through the first aperture and inserted into the secondary aperture. A reinforcing bar is extended through and inserted within the secondary aperture. The extension occurring to an extent sufficient so as to substantially crush the adhesive capsule. The adhesive material is activated upon crushing of the adhesive capsule and the adhesive material forms an adhering interconnection between interior surfaces of the secondary aperture and the exterior surfaces of the reinforcing bar. The reinforcing bar is inserted a sufficient distance and length so that the reinforcing bar extends at least through a portion of the first aperture within the liner wall. If necessary, a portion of a near end of the reinforcing bar is removed so that the near end of the reinforcing bar is located within the first aperture of the liner wall but moved a distance away from a plane formed by an interior surface of the liner wall. A weld overlay material is applied to the near end of the reinforcing bar so that the reinforcing bar is welded to the liner wall. The weld overlay material is finished so as to be substantially flush with the plane of the interior surface of the liner wall. The above steps are repeated a plurality of times at differing locations along the liner wall so as to form an anchoring of the liner wall to the backing wall.

In one embodiment of the invention, an air carbon-arc torch is used to complete formation of the first aperture.

In a further embodiment, a liquid is injected into the secondary aperture for purposes of washing the interior surfaces of the secondary aperture.

In yet another embodiment, the interior surfaces of the secondary aperture are roughened. Preferably, the roughening is performed through the use of a wire brush.

In another embodiment, dust particles created by roughening the interior surfaces of secondary aperture are removed from the secondary aperture. Preferably, the dust particles are removed by an air blower extending through the first aperture into the second aperture.

BRIEF DESCRIPTION OF THE DRAWINGS

The invention will now be described with respect to the drawings, in which.

DESCRIPTION OF THE PREFERRED EMBODIMENT

Figure 1:
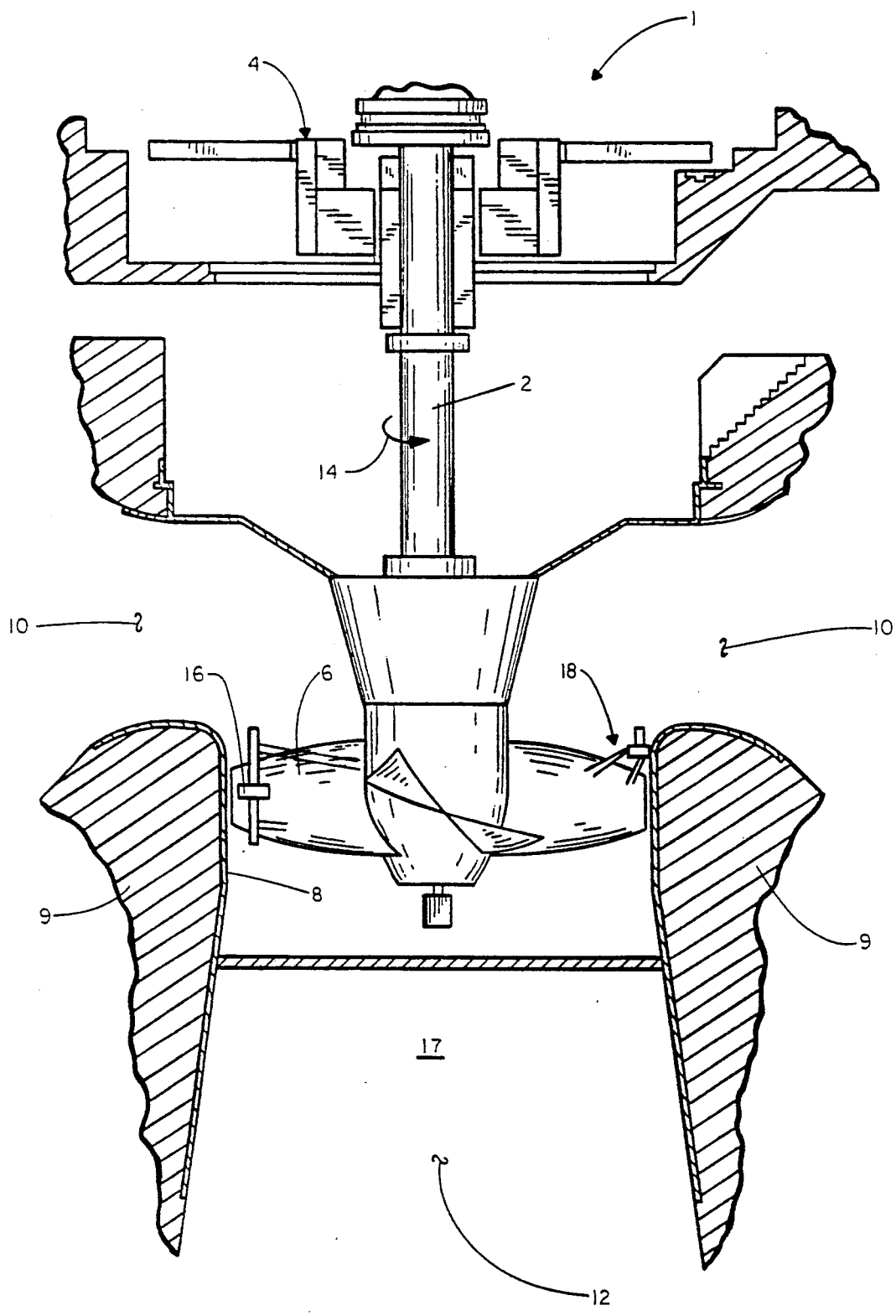
FIG. 1 is a sectional view generally illustrating a hydroelectric facility and generally showing the positional relationship of repair and rotational apparatus, relative to other components of the hydroelectric facility.

The principles of the process invention are disclosed, by way of example, in a hydroelectric facility turbine structure 1 as illustrated in FIG. 1. As will be described in subsequent paragraphs herein, and in accordance with the invention, an anchoring process can be employed with the turbine and liner wall structure 1 for purposes of preventing shrinkage and warpage resulting from repair of damage to turbine liner walls, where such damage include pitting and other surface deterioration caused by phenomena such as cavitation. In particular, an anchoring process in accordance with the invention includes functions which allow for anchoring of a turbine liner wall to a backing wall while the liner wall is in place.

Prior to describing details of the anchoring process in accordance with the invention, a description of the hydroelectric turbine structure 1 and associated components for turning the turbine blades will be described. The turbine turning mechanism described herein is substantially disclosed in the commonly assigned U.S. Pat. No. 4,884,326 issued to Porter et al on Dec. 5, 1989. However, it should be emphasized that an anchoring process as described and claimed herein can be employed with various other types of turbine mechanisms and repair arrangements, and is not limited to use with the specific turning mechanism and repair arrangement described herein.

Turning to FIG. 1, the hydroelectric turbine structure 1 comprises a vertically mounted turbine shaft 2 with a generator rotor assembly 4 mounted thereto. The generator rotor assembly 4 is a conventional assembly adapted for creation of electricity as the result of rotation. As further shown in FIG. 1, the generator rotor assembly 4 is typically mounted at the uppermost portion of the turbine shaft 2.

Adjacent and interconnected with the lower portion of the turbine shaft 2 is a series of turbine blades 6, three of which are illustrated in FIG. 1. The turbine blades 6 are mounted typically in a "pitched" configuration so that the terminating ends thereof are in close proximity to a turbine liner wall 8. The turbine liner wall 8 is typically constructed in the shape of a cylinder and is generally composed of a wear-resistant and corrosion-resistant steel. For example, the turbine liner wall 8 may be constructed of a carbon-based steel.

The turbine liner wall 8 is located adjacent a backing wall 9. The backing wall 9 substantially provides a stable base for the entirety of the turbine structure 1. The backing wall 9 is typically constructed of a hardened and cementitious material, such as concrete. During construction, vertical and horizontal stiffeners (not shown) may be welded or otherwise interconnected to each other and to the liner wall 8, and then interconnected with the concrete backing wall 9. For example, such stiffeners may be embedded within grout behind the liner wall 8. The stiffeners are utilized for supporting the liner wall 8 during construction and for facilitating the original construction.

Although not specifically illustrated in FIG. 1, the turbine structure 1 will typically also include a series of gates for controlling the entry of water into an inlet channel 10. The inlet channel 10 is positioned above the turbine blades 6. As a result of gravitational forces, the water flowing into the inlet channel 10 will fall downwardly and flow over the turbine blades 6 into a discharge channel 12. Pressures exerted by the flow of water on the turbine blades 6, with the relative pitch of the turbine blades 6, will cause the entirety of the turbine shaft assembly to rotate in the direction of arrow 14 as further illustrated in FIG. 1. This rotation of the turbine shaft assembly in the direction of arrow 14 will cause corresponding rotation of the generator rotor assembly 4. Rotation of the generator rotor assembly 4 will, through conventional means, cause the generation of electricity.

As previously described in the section entitled "Background of the Invention", an undesirable result of the water flow through the hydroelectric turbine structure 1 is cavitation erosion on the turbine blades 6 and the turbine liner wall 8. That is, the inner surface of the wall of the turbine liner wall 8, in addition to the surfaces of the turbine blades 6, are subject to erosion and pitting, primarily caused by cavitation as previously described herein. For purposes of repairing such surface deterioration, the gates (not shown) of the hydroelectric turbine structure 1 would first be closed. Correspondingly, and if necessary, water remaining within the turbine structure 1 can be removed by pumping or other conventional means.

For purposes of repairing the surface deterioration, and if desired, a temporary floor structure 15 can be constructed across the turbine chamber 17 formed internally of the turbine liner wall 8. During repair operations, the floor structure 15 would remain stationary, notwithstanding rotation of the turbine blades 6 during repair as described in subsequent paragraphs herein.

When the water has been removed from the turbine chamber 17 and environmental conditions are appropriate for repair operations, a repair assembly 16 can be mounted adjacent a terminating end of one of the turbine blades 6 as further illustrated in FIG. 1. The repair assembly 16 is mounted to one of the turbine blades 6 in a manner so that specific repair operations can be undertaken with respect to the turbine liner wall 8 during rotation of the turbine blades 6. For example, the repair assembly 16 can comprise apparatus for undertaking grinding and welding operations during turbine blade rotation. In addition, apparatus for removing surface corrosion and epoxy, such as water blasting apparatus and sanding apparatus, can also be employed. Erosion can be repaired by a process of grinding away the eroded material, and replacing this material with new metal material by a welding operation, utilizing the appropriate components of the repair assembly 16. A suitable grinder arrangement which can be utilized for the repair assembly 16 is disclosed in the commonly assigned U.S. patent application Ser. No. 397,051, Porter, filed Aug. 22, 1989.

Following conditioning of the surfaces of the turbine blades 6 and the liner wall 8, weld material, such as stainless steel or other cavitational resistant alloys, could be applied to the liner wall 8 during rotation of turbine blades 6. After such application, further machining operations could be undertaken to "smooth" the stainless steel buildup on the liner wall 8.

For purposes of utilizing the repair assembly 16 as previously described herein, a means must be provided for achieving a steady and controllable rotation of the turbine shaft 2 and turbine blades 6. Preferably, the rotational speed is variable and may, for example, be in the range of zero to 200 r.p.m. Rotation of the turbine shaft 2 during repair operations can be accomplished with a turbine turning mechanism 18 as generally shown in FIG. 1.

Although not specifically shown in the drawings, the turbine turning mechanism 18 can include a suitable mounting and support assembly for securely attaching components of the mechanism 18 to the turbine blade 6. For example, the turning mechanism 18 can include a series of support braces or similar elements secured to a blade 6 by welding or otherwise securing the lower ends of the braces to the pitched surface of one of the blades 6. The principal requirement of such a mounting assembly is to provide a relatively rigid and secure attachment of the turbine turning mechanism 18 to a turbine blade 6.

The turning mechanism 18, for example, can include a turning wheel rotatably driven by a motor drive assembly. The turning mechanism 18 can be supported at a location along the blade 6 so that the turning wheel 22 is in relatively close proximity to the turbine liner wall 8. The turning wheel 22 can be of a conventional annular configuration, and preferably should be constructed of a durable and wear-resistant material.

The turning wheel can be coupled to a conventional drive shaft. In turn, the drive shaft can be coupled to the motor drive assembly through a gear reduction mechanism. The gear reduction mechanism can include a means for reduction of rotational speed of the drive shaft and turning wheel, relative to operational speed of the motor drive assembly, while correspondingly increasing torque of the shaft and wheel.

Preferably, the turning wheel can be biased so as to be selectively urged against a surface of the liner wall 8 with a sufficient frictional force between the wheel and the wall 8 such that rotation of the wheel relative to the wall 8 will result in frictional forces between the same being translated into rotational forces exerted on the turbine blade 6. Accordingly, rotational operation of the turning wheel will cause the turbine blade 6 to which the turning mechanism 18 is attached to rotate and, correspondingly, further cause rotation of the entirety of the turbine blades 6 and turbine shaft 2. With an appropriate positional relationship of the turning mechanism 18 relative to the configuration of the turbine blades 6 and position of turbine shaft 2, a substantial "mechanical advantage" can be created. For example, with a mounting of the turning mechanism 18 adjacent an outermost edge of a turbine blade 6, relatively small drive forces can be exerted by the motor drive assembly on the turning wheel to successfully rotate the relatively massive turbine shaft 2 and turbine blades 8. A turning mechanism suitable for use as turning mechanism 18 is disclosed in the commonly assigned U.S. Pat. No. 4,884,324 issued to Porter et al on Dec. 5, 1989.

As previously described in the Section entitled "Background of the Invention," certain metallurgical phenomena may occur as a result of the welding of stainless steel material to the liner wall 8. More specifically, for example, if the liner wall 8 is formed of materials such as carbon steel, and the weldments comprise stainless steel, shrinkage may occur. With welding stringer beads utilized to clad the liner wall 8, the actual amount of shrinkage is substantially proportional to the number of stringer beads utilized for the cladding. That is, as the number of stringer beads utilized increases, the shrinkage forces exerted against the vertical and horizontal stiffeners holding the liner wall 8 to the concrete backing wall 9 will correspondingly increase. However, of primary importance, the areas of the liner wall 8 between the stiffeners will be extremely vulnerable to shrinkage, since no anchoring of this portion of the liner wall 8 to the concrete backing wall 9 exists.

Figure 2:
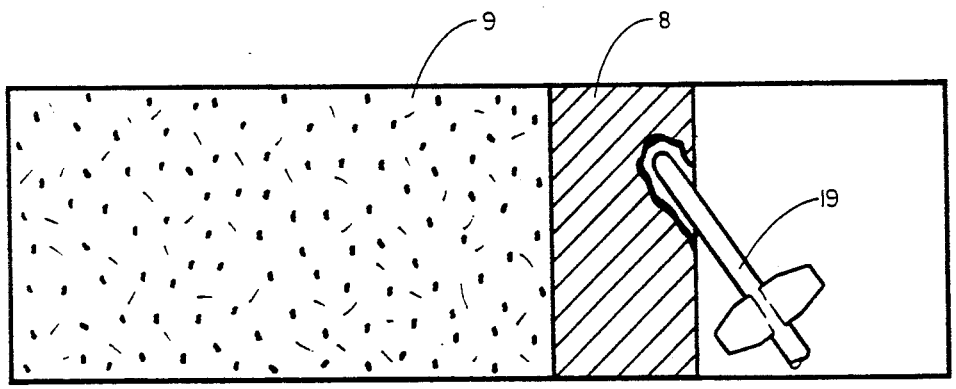
FIG. 2 is a sectional side view showing a portion of the liner wall and concrete backing wall, and further showing the cutting and gouging of the liner wall with an air carbon-arc torch.

For purposes of avoiding this problem, and in accordance with the invention, a process can be employed for purposes of anchoring the liner wall 8 to the concrete backing wall 9, while the liner wall 8 remains in place. More specifically, FIG. 2 illustrates a section of the liner wall 8 adjacent a corresponding section of the concrete backing wall 9. The thickness or width of the liner wall 8 at any particular location therealong will depend on the original construction of the liner wall 8 and the pitting or cavitation damage which has occurred to the liner wall 8. It is expected that the thickness of the liner wall 8 may vary anywhere from 0.25 inch to 1.5 inches. For purposes of illustration and explanation, the portion of the liner wall 8 and adjacent concrete backing wall 9 shown in FIG. 2 and other drawings subsequently described herein will be assumed to be portions which do not correspond with locations of vertical or horizontal stiffeners (not shown) which may be utilized to support the liner wall 8 adjacent the concrete backing wall 9.

In accordance with the invention, the anchoring process first requires the positioning of an aperture 20 within the liner wall 8. This aperture 20 is produced by essentially "gouging" a hole within the liner wall 8. Preferably, and as specifically shown in FIG. 2, an air carbon-arc torch 19 can be employed for purposes of gouging the liner wall 8 and cutting the aperture 20 through the liner wall 8. Various types of torches can be employed as the torch 19. For example, one type of available torch suitable for such activity is a torch of the angle-arc torch family manufactured by Arcair. The air carbon-arc torch 19 is conventional in nature and can be employed as shown in FIG. 2 for gouging liner wall 8 and cutting through the liner wall 8 so as to provide the aperture 20 as shown in FIGS. 3-10. However, it should be emphasized that various other tools and techniques can be employed for purposes of providing the aperture 20 within the liner wall 8, and the principles of the invention are not limited to the specific torch tooling illustrated in FIG. 2 and described herein.

Figure 3:
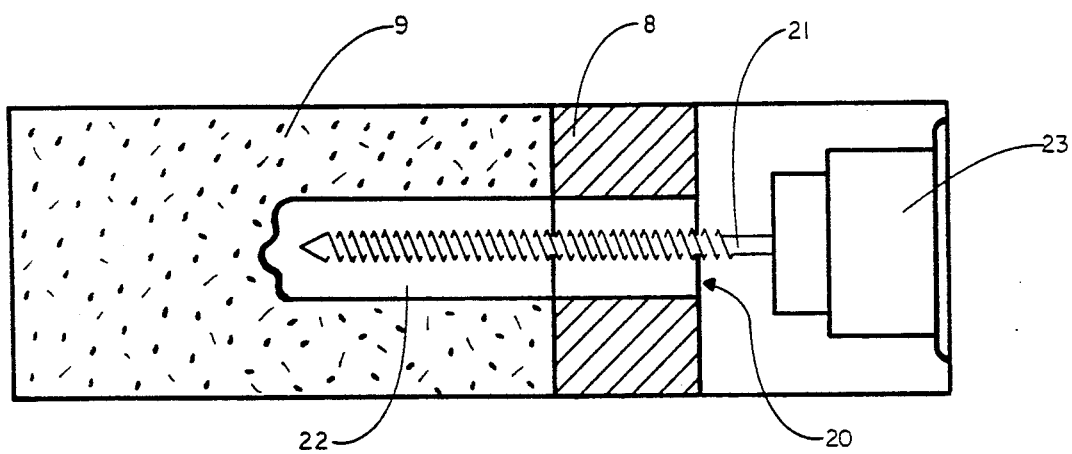
FIG. 3 is a sectional side view showing a portion of the liner wall and concrete backing wall, and further showing the drilling of an aperture into the concrete backing wall.

After the aperture 20 has been formed within the liner wall 8, a second aperture 22 is preferably drilled into the concrete backing wall 9. FIG. 3 illustrates the use of a conventional drill 23 having an associated drill bit 21 utilized for this purpose. The drill bit 21 is inserted through the previously formed aperture 20 within the liner wall 8 and comprises a concrete drill bit for purposes of providing the aperture 22 within the concrete backing wall 9.

As will be described in subsequent paragraphs herein, the diameter of the aperture 20 should preferably be at least 0.25 inches. The second aperture 22 should also preferably be of a diameter of at least 0.25 inches. In addition, the secondary aperture 22 should be coaxial with the corresponding aperture 20 and should also be drilled to a depth within the concrete backing wall 9 sufficient for purposes (as described in subsequent paragraphs herein) of embedding a reinforced steel bar in a manner so as to appropriately support the liner wall 8. As will be further described in subsequent paragraphs herein, a depth which may be employed is 16.5 inches.

Figure 4:
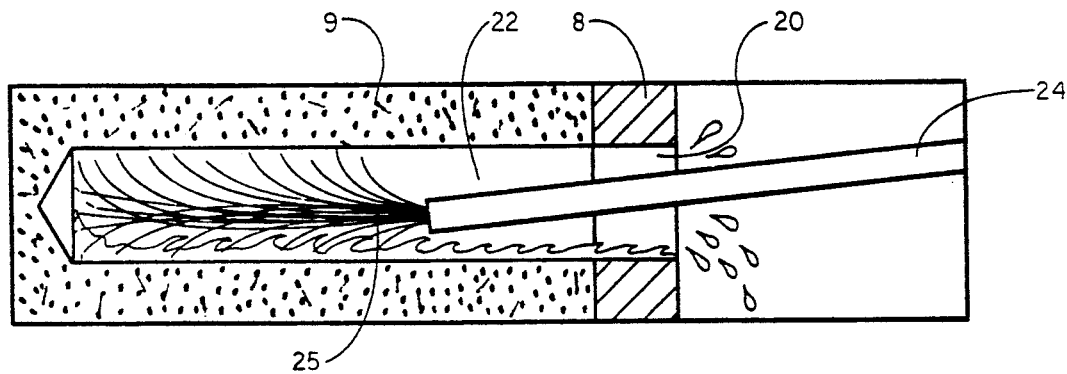
FIG. 4 is a sectional side view showing a portion of the liner wall and concrete backing wall, and further showing the washing of the backing wall aperture with water.

After the aperture 20 and secondary aperture 22 have been formed in the liner wall 8 and concrete backing wall 9, respectively, it is preferable to cleanse the secondary aperture 22. For example, as generally shown in FIG. 4, an appropriate water hose 24 or the like can be employed for applying a pressure spray 25 to the secondary aperture 22. A primary purpose of this water spraying process is to remove loose cementitious particles and the like from the secondary aperture 22.

Figure 5:
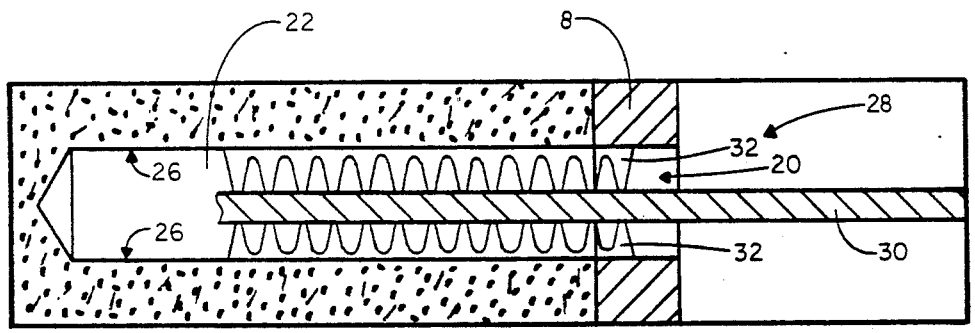
FIG. 5 is a sectional side view showing the liner wall and the adjacent concrete backing wall, and further showing the "roughing" of the backing wall aperture with a wire brush.

Following the cleansing of the secondary aperture 22, it is preferable to "roughen" the interior surfaces 26 of the secondary aperture 22. As illustrated in FIG. 5, a suitable wire brush 28 or the like, having a handle 30 and sets of bristles 32 can be employed. The wire brush 28 can be inserted through the aperture 20 of the liner wall 8 and into the secondary aperture 22 of concrete backing wall 9. The size and configuration of the bristles 32 are preferably such that the bristles 32 readily rub against the interior walls 26 of the secondary aperture 22. The purpose of the brushing process employing the wire brush 28 is to roughen the interior surfaces 26 of the secondary aperture 22 so that appropriate adhesives (as described in subsequent paragraphs herein) will readily adhere to the interior surfaces 26.

Figure 6:
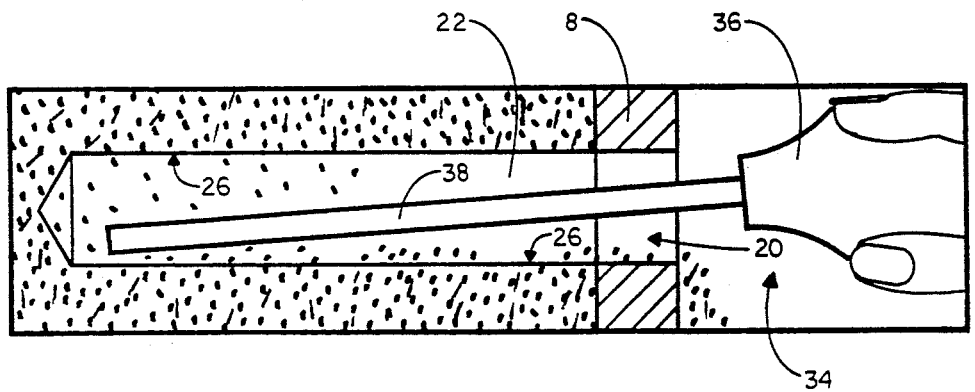
FIG. 6 is a sectional side view showing the liner wall and the adjacent concrete backing wall, and further showing dust being blown from the backing wall aperture.

As a result of the roughening of the interior surfaces 26 of secondary aperture 22, relatively fine particles will be loosened from the interior surfaces 26 of the secondary aperture 22. These fine particles, in the form of dust materials, are preferably removed prior to any further activity with respect to the anchoring process. Accordingly, FIG. 6 illustrates the use of a blower apparatus 34 having a conventional blower mechanism 36 with an extended air rod 38 extending from the blower mechanism 36. The air rod 38 is extended through the aperture 20 of liner wall 8 and into the secondary aperture 22 of the concrete backing wall 9. Energizing of the blower apparatus 34 will cause the apparatus 34 to blow the dust particles from secondary aperture 22 outwardly. With the dust particles removed from the secondary aperture 22, the secondary aperture 22 now comprises a substantially "clean" hole within the concrete backing wall 9, but with relatively roughened interior surfaces 26 for purposes of appropriate adherence of adhesive material.

Figure 7:
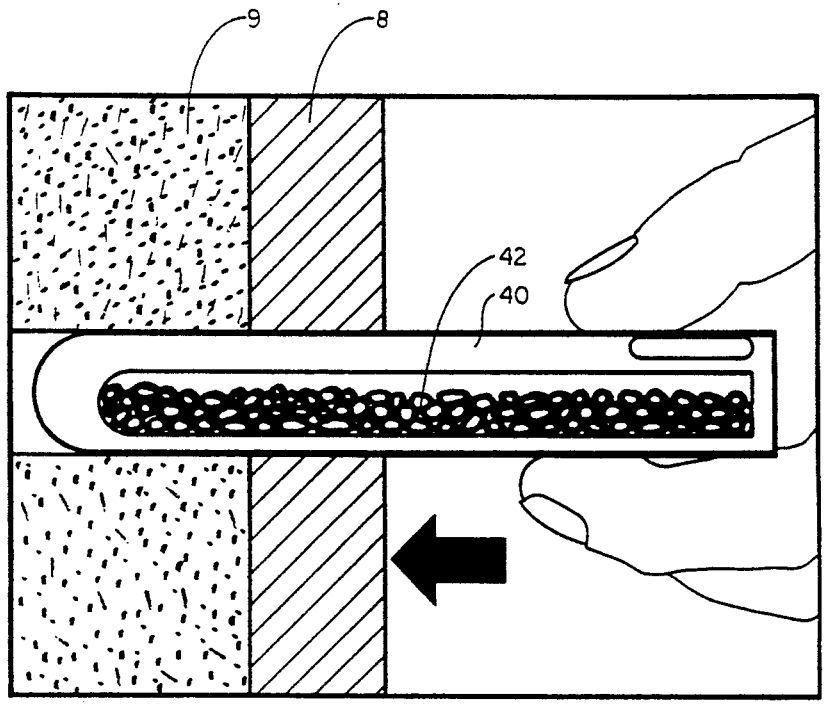
FIG. 7 is a sectional side view of a portion of the liner wall and an adjacent portion of the concrete backing wall, and further showing the insertion of an adhesive capsule into the backing wall aperture.

After cleaning and roughening of the secondary aperture 22, an appropriate adhesive material is inserted through the liner wall aperture 20 and into the concrete backing wall 9. Preferably, in accordance with the invention, an adhesive material is utilized which remains unactivated until such time as a reinforcing element is inserted into the aperture 22 as described in subsequent paragraphs herein. For example, and as illustrated in FIG. 7, a gelatinous capsule 40 comprising an adhesive material 42 can be manually inserted through the aperture 20 of liner wall 8 and into the secondary aperture 22 of concrete backing wall 9. If necessary or desired, any type of appropriate elongated mechanism (not shown) can be utilized to facilitate insertion of the capsule 40. The capsule 40 includes the adhesive material 42 and essentially comprises a "breakable capsule", whereby the adhesive material is not activated until such time as the capsule is broken. For example, an HEA capsule can be utilized as manufactured by Hilti, Incorporated of Tulsa, Okla.

Figure 8:
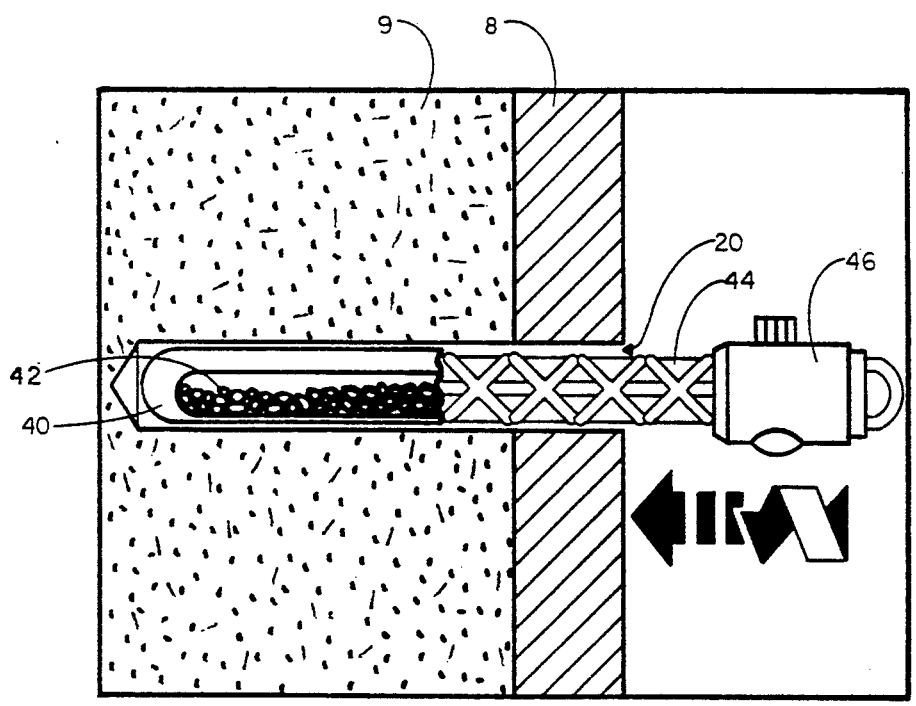
FIG. 8 is a sectional side view showing a portion of the liner wall and an adjacent portion of the concrete backing wall, and further showing the insertion of a "rebar" into the backing wall aperture.

After the adhesive-containing capsule 40 has been inserted into the secondary aperture 22 and as shown in FIG. 8, a steel reinforcing bar 44 (commonly referred to as a "rebar") can be inserted through the aperture 20 of liner wall 8 and into the secondary aperture 22 of concrete backing wall 9. Preferably, the reinforcing bar 44 includes, at its near end, a cutting mechanism 46 for purposes of cutting or "gouging" the reinforcing bar 44 so as to form the bar 44 of an appropriate length. As the reinforcing bar 44 is inserted into the secondary aperture 22, the capsule 40 is essentially "crushed" and the adhesive material 42 is released and activated. As the adhesive material 42 is released from the capsule 40, it provides adhesion between the reinforcing bar 44 and the interior surfaces 26 of the secondary aperture 22. In this manner, the reinforcing bar 44 is rigidly secured and stabilized within the secondary aperture 22. Relatively "quick hardening" adhesive materials can be employed for the adhesive material 42.

Figure 9:
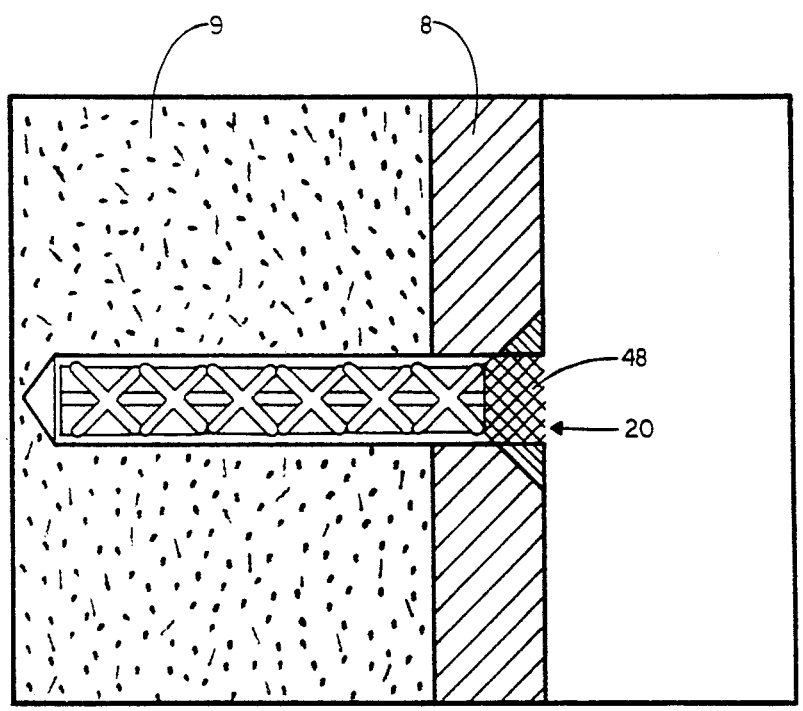
FIG. 9 is a sectional side view showing a portion of the liner wall and an adjacent portion of the concrete backing wall, and further showing the welding of the backing wall and liner wall apertures flush with the inner liner wall surface.

After the reinforcing bar 44 has been appropriately inserted into the secondary aperture 22 and rigidly stabilized therein, the cutting mechanism 46 or any other suitable means can be utilized to cut off and "gouge" the reinforcing bar 44 an appropriate distance into the liner wall 8. FIG. 9 illustrates the reinforcing bar 44 as cut beneath the interior surface of the liner wall 8. After the reinforcing bar 44 has been appropriately cut to a predetermined distance below the interior surface of the liner wall 8, weld overlay material 48 can be applied to the reinforcing bar 44 within the liner wall aperture 20. Preferably, the weld overlay material is applied so that the material fills up the aperture 20 in a manner such that the material is flush with the interior surface of the liner wall 8. In this manner, the reinforcing bar 44 is appropriately welded to the liner wall 8 and provides a rigid and stable interconnection of the liner wall 8 to the concrete backing wall 9 through the reinforcing bar 44. As earlier described, the reinforcing bar 44 is rigidly secured to the concrete backing wall 9 through the adhesive material 42.

Figure 10:
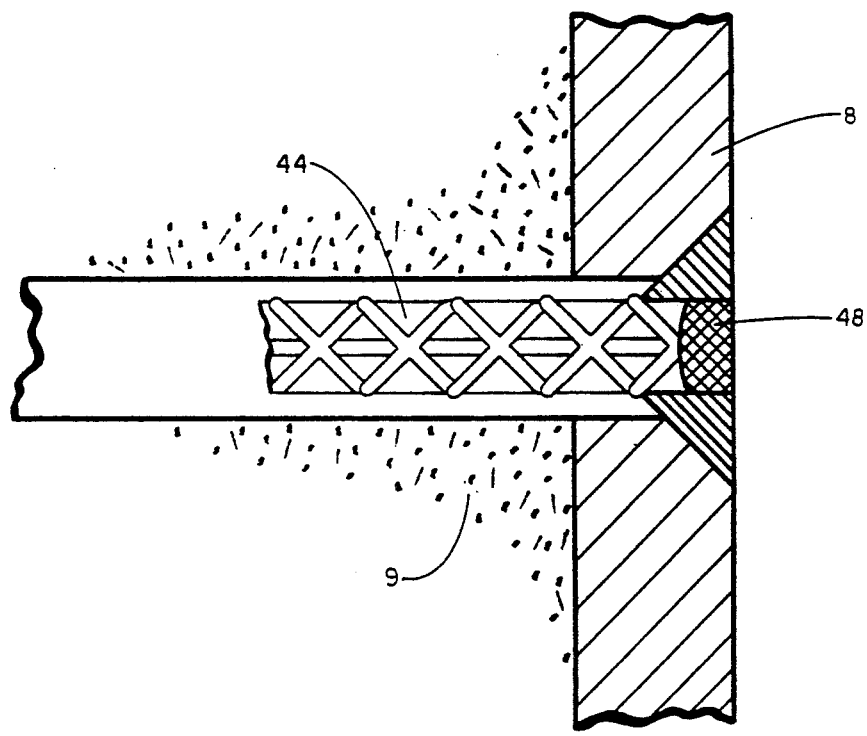
FIG. 10 is a sectional side view showing a portion of the liner wall and an adjacent portion of the concrete backing wall, and further showing the finished anchoring arrangement for appropriately anchoring the liner wall to the backing wall.

FIG. 10 illustrates the general arrangement of the anchoring process after completion. Again, the reinforcing bar 44 is rigidly secured within the secondary aperture 22 through the adhesive material 42 released from the capsule 40. Correspondingly, the reinforcing bar 44 is rigidly secured within the aperture 20 to the liner wall 8 through the weld overlay material 48. As shown in FIG. 10, the reinforcing bar 44 should be cut off or gouged a distance below the interior surface of the liner wall 8 such that sufficient weld overlay material can be applied to the aperture 20 so as to appropriately secure the reinforcing bar 44 to the liner wall 8.

In operation, it appears that it is preferable to utilize a secondary aperture 22 having a diameter of at least 1.25 inches. Correspondingly, the depth or length of the secondary aperture 22 should be of a sufficient depth such that the liner wall 8 does not tend to move away from the concrete backing wall 9. That is, the reinforcing bar 44 should be secured a substantial distance into the secondary aperture 22 and the concrete backing wall 9. For example, a depth of 16.5 inches can be employed for the secondary aperture 22. With respect to the positioning of the cut off of the reinforcing bar 44 adjacent the interior surface of the liner wall 8, it has been found that this cut off should occur in a manner such as to allow a minimum of 3/16 inch finished thickness of weld overlay material 48.

The foregoing paragraphs have described the anchoring process in accordance with the invention with respect to a single set of apertures 20, 22 and reinforcing bar 44. Preferably, a series of these apertures and reinforcing bars should be utilized in the areas of the liner wall 8 apart from the vertical and horizontal stiffeners. For example, for a liner wall 8 having a 9 foot section, it would be preferable to utilize a number of reinforcing bars 44 in the range of approximately 500.

In accordance with the foregoing process in accordance with the invention, the liner wall 8 is rigidly secured and stabilized relative to the concrete backing wall 9, even apart from the locations of the vertical and horizontal stiffeners. Of particular importance, it is preferable if the liner wall 8 is positioned substantially flush with the concrete backing wall 9. If, in fact, spaces exist between the liner wall 8 and the concrete backing wall 9, it is preferable to apply grout between the liner wall 8 and the backing wall 9. Without this grouting process, the liner wall 8 may tend to vibrate under the substantial water pressure existing during operation of the hydraulic turbine. Such vibration can be of primary importance after repairs, since the vibrations can tend to crack stainless steel weld material utilized during the repair process.

It should be noted that various additions, substitutions and other modifications of the functions associated with the anchoring process described herein can be made without departing from the novel principles of the invention. For example, the anchoring process described herein can be employed with other types of hydraulic turbines and other types of repair mechanisms. As a further example, the anchoring process described herein can be utilized in conjunction with any type of cylindrical wall structure requiring anchoring or reinforcement relative to a backing structure. Of particular advantage, the anchoring process described herein does not require any removal of the liner wall relative to the backing structure, and the anchoring process can be provided "in place."

It should further be noted that the particular elements utilized in the anchoring process described herein are not meant to be an exhaustive enumeration of the elements which can be utilized in accordance with the anchoring process invention. Accordingly, it will be apparent to those skilled in the pertinent art that modifications and variations of the above-described illustrative embodiment of the invention can be effected without departing from the spirit and scope of the novel concepts of the invention.

The embodiments of the invention in which an exclusive property or privilege is claimed are defined as follows:

1. A method for use in a hydroelectric turbine structure comprising a turbine shaft, a generator rotor assembly coupled to an upper portion of said turbine shaft, a turbine blade assembly coupled to a lower portion of said turbine shaft, with said blade assembly comprising a plurality of turbine blades extending radially from said turbine shaft, and a turbine chamber having a cylindrical configuration and formed by a vertically disposed turbine liner wall adjacent distal ends of said turbine blades, and a backing wall located behind and substantially abutting said liner wall, said method providing anchoring of said liner wall to said backing wall during a repair process in a manner such that said liner wall is maintained in place within said hydroelectric turbine structure relative to said backing wall, said method comprising the steps of:

(a) forming a first aperture within and extending through said liner wall, in a position apart from other elements of said hydroelectric turbine structure supporting or otherwise interconnecting said liner wall to said backing wall;

(b) forming an elongated secondary aperture in said backing wall adjacent to and substantially coaxial with said first aperture;

(c) extending through said first aperture and inserting into said secondary aperture an adhesive capsule containing an inactive adhesive material;

(d) extending through and inserting within said secondary aperture a reinforcing bar, said extension occurring to an extent sufficient so as to substantially crush said adhesive capsule, wherein said adhesive material is activated upon crushing of said adhesive capsule and said adhesive material forms an adhering interconnection between interior surfaces of said secondary aperture and exterior surfaces of said reinforcing bar;

(e) said insertion of said reinforcing bar being of a sufficient distance and a length of said reinforcing bar being of a sufficient value so that said reinforcing bar extends at least through a portion of said first aperture within said liner wall;

(f) removing, if necessary, a portion of a near end of said reinforcing bar so that said near end of said reinforcing bar is located within said first aperture of said liner wall but removed a distance away from a plane formed by an interior surface of said liner wall;

(g) applying a weld overlay material to said near end of said reinforcing bar so that said reinforcing bar is welded to said liner wall, said weld overlay material being finished so as to be substantially flush with said plane of said interior surface of said liner wall; and (h) repeating method steps a-g a plurality of times at differing locations along said liner wall so as to form an anchoring of said liner wall to said backing wall.

2. A method for use in a hydroelectric turbine structure comprising a turbine shaft, a generator rotor assembly coupled to an upper portion of said turbine shaft, a turbine blade assembly coupled to a lower portion of said turbine shaft, with said blade assembly comprising a plurality of turbine blades extending radially from said turbine shaft, and a turbine chamber having a cylindrical configuration and formed by a vertically disposed turbine liner wall adjacent distal ends of said turbine blades, and a backing wall located behind and substantially abutting said liner wall, said method providing anchoring of said liner wall to said backing wall during a repair process in a manner such that said liner wall is maintained in place within said hydroelectric turbine structure relative to said backing wall, said method comprising the steps of:

(a) forming a first aperture within and extending through said liner wall, in a position apart from other elements of said hydroelectric turbine structure supporting or otherwise interconnecting said liner wall to said backing wall;

(b) forming an elongated secondary aperture in said backing wall adjacent to and substantially coaxial with said first aperture;

(c) extending through said first aperture and inserting into said secondary aperture an elongated mechanical element;

(d) causing an interconnection between said elongated mechanical element and interior surfaces of said secondary aperture;

(e) said insertion of said mechanical element being of a sufficient distance and a length of said mechanical element being of a sufficient value so that said mechanical element extends at least through a portion of said first aperture within said liner wall;

(f) causing a near end of said elongated mechanical element to be interconnected with interior surfaces of said first aperture; and (g) repeating method steps a-f a plurality of times at differing locations along said liner wall so as to form an anchoring of said liner wall to said backing wall.

3. A method for use in a substantially cylindrical structure having a substantially cylindrical inner liner wall and a backing wall located behind and substantially abutting said liner wall, said method providing anchoring of said liner wall to said backing wall and comprising the steps of:

(a) forming a first aperture within and extending through said liner wall, in a position apart from other elements of said substantially cylindrical structure supporting or otherwise interconnecting said liner wall to said backing wall;

(b) forming an elongated secondary aperture in said backing wall adjacent to and substantially coaxial with said first aperture;

(c) extending through said first aperture and inserting into said secondary aperture an adhesive material;

(d) extending through and inserting within said secondary aperture a reinforcing element, said extension occurring to an extent sufficient so that said adhesive material forms an adhering interconnection between interior surfaces of said secondary aperture and exterior surfaces of said reinforcing element;

(e) said insertion of said reinforcing element being of a sufficient distance and a length of said reinforcing element being of a sufficient value so that said reinforcing element extends at least through a portion of said first aperture within said liner wall;

(f) applying a weld overlay material to said near end of said reinforcing element so that said reinforcing element is welded to said liner wall; and (g) repeating method steps a-f a plurality of times at differing locations along said liner wall so as to form an anchoring of said liner wall to said backing wall.

4. A method in accordance with claim 3 characterized in that said adhesive material is initially inactive when inserted into said secondary aperture.

5. A method in accordance with claim 4 characterized in that said initial inactive adhesive material is activated by insertion of said reinforcing element into said secondary aperture.

6. A method in accordance with claim 3 characterized in that said adhesive material remains essentially inactive until said reinforcing element is introduced into said first aperture and said secondary aperture.

7. A method in accordance with claim 6 characterized in that said adhesive material is re-distributed around said reinforcing element which has been inserted into said secondary aperture, whereby activating an adhesion process.

8. A method in accordance with claim 3 characterized in that said adhesive material comprises a capsule containing an inactive adhesion material.

9. A method in accordance with claim 8 characterized in that said capsule is crushed upon insertion of said reinforcing element into said secondary aperture, thereby activating said inactive adhesion material.

10. A method in accordance with claim 9 characterized in that said adhesion material forms said adhering interconnection between said interior surfaces of said secondary aperture and said exterior surfaces of said reinforcing element.

11. A method in accordance with claim 3 characterized in that said method further comprises the step of removing, if necessary, a portion of a near end of said reinforcing element so that said near end of said reinforcing element is located within said first aperture of said liner wall but removed a distance away from a plane formed by an interior surface of said liner wall.

12. A method in accordance with claim 3 characterized in that said method further comprises the step of finishing said weld overlay material so that said material is substantially flush with a plane formed by an interior surface of said liner wall.

13. A method in accordance with claim 3 characterized in that said method further comprises the step of initiating formation of said first aperture by gouging said liner wall.

14. A method in accordance with claim 3 characterized in that said method comprises the use of an air carbon-arc torch to complete formation of said first aperture.

15. A method in accordance with claim 3 characterized in that said method further comprises the step of injecting a liquid into said secondary aperture for purposes of washing said interior surfaces of said secondary aperture.

16. A method in accordance with claim 3 characterized in that said method further comprises the step of roughing said interior surfaces of said secondary aperture.

17. A method in accordance with claim 16 characterized in that said roughing of said interior surfaces of said secondary aperture is performed through the use of a wire brush.

18. A method in accordance with claim 16 characterized in that said method further comprises the step of removing from said secondary aperture dust particles created by roughing said interior surfaces of said secondary aperture.

19. A method in accordance with claim 18 characterized in that said method comprises the use of an air blower extending through said first aperture and into said secondary aperture for purposes of removal of said dust particles.

20. A method in accordance with claim 3 characterized in that said method is used in a hydroelectric turbine structure comprising a turbine shaft, a generator rotor assembly coupled to an upper portion of said turbine shaft, a turbine blade assembly coupled to a lower portion of said turbine shaft, with said blade assembly comprising a plurality of turbine blades extending radially from said turbine shaft, and said substantially cylindrical structure comprises a turbine chamber having a cylindrical configuration, with said liner wall comprising a vertically disposed turbine liner wall adjacent distal ends of said turbine blades, and said backing wall is located behind and substantially abutting said turbine liner wall.

21. A method in accordance with claim 20 characterized in that said method provides anchoring of said turbine liner wall to said backing wall during a repair process in a manner such that said turbine liner wall is maintained in place within said hydroelectric turbine structure relative to said backing wall.

* * * * *

UNITED STATES PATENT AND TRADEMARK OFFICE
CERTIFICATE OF CORRECTION

PATENT NO. : 5,134,774

DATED : August 4, 1992

INVENTOR(S) : BENNY R. PORTER

It is certified that error appears in the above-identified patent and that said Letters Patent is hereby corrected as shown below:

Col. 16, claim 5, line 37, delete "initial" and substitute therefor --initially--.

Signed and Sealed this

Twenty-fourth Day of August, 1993

Attest:

BRUCE LEHMAN

Attesting Officer

Commissioner of Patents and Trademarks